United States Patent [19]

Lutzow et al.

[11] Patent Number: 5,466,516
[45] Date of Patent: Nov. 14, 1995

[54] THERMOPLASTIC FIBER LAMINATE

[75] Inventors: Thomas H. Lutzow, Milwaukee; Daniel E. Ryan, Brookfield, both of Wis.

[73] Assignee: Matarah Industries, Inc., Milwaukee, Wis.

[21] Appl. No.: 120,040

[22] Filed: Sep. 10, 1993

Related U.S. Application Data

[63] Continuation-in-part of Ser. No. 597,811, Oct. 15, 1990, abandoned.

[51] Int. Cl.[6] .............................. B32B 5/22; B32B 27/00; B32B 3/06; D04H 1/16
[52] U.S. Cl. .................... 428/282; 428/102; 428/286; 428/288; 428/296; 428/299; 428/300; 428/903
[58] Field of Search ............................ 428/102, 282, 428/286, 288, 296, 299, 300, 903

[56] References Cited

U.S. PATENT DOCUMENTS

| | | | |
|---|---|---|---|
| 1,802,814 | 4/1931 | Henderson | 156/554 |
| 2,424,558 | 7/1947 | Delano | 154/42 |
| 3,994,759 | 11/1976 | Stoller | 156/85 |
| 4,041,203 | 8/1977 | Brock et al. | 428/157 |
| 4,436,780 | 3/1984 | Hotchkiss et al. | 428/198 |
| 4,469,734 | 9/1984 | Minto et al. | 428/134 |
| 4,788,100 | 11/1988 | Janssen et al. | 428/234 |
| 4,863,785 | 9/1989 | Berman et al. | 428/218 |
| 4,863,790 | 9/1989 | Horacek et al. | 428/285 |
| 4,868,032 | 9/1989 | Eian et al. | 428/198 |
| 4,885,202 | 12/1989 | Lloyd et al. | 428/171 |
| 4,950,531 | 8/1990 | Radwanski et al. | 428/284 |
| 4,983,452 | 1/1991 | Daimon et al. | 428/287 |
| 5,080,951 | 1/1992 | Guthrie | 428/85 |
| 5,167,754 | 12/1992 | Lutzow et al. | 156/549 |

FOREIGN PATENT DOCUMENTS 497788 12/1938 United Kingdom

*Primary Examiner*—George F. Lesmes
*Assistant Examiner*—Kathryn E. Shelborne
*Attorney, Agent, or Firm*—Nilles & Nilles

[57] ABSTRACT

A three layer laminated sheet of nonwoven thermoplastic fibers made by laminating a layer of meltblown fibers between two layers of needle punched fibers, and ultrasonically welding the layers together at a number of discrete points uniformly across the length and width of the sheet.

9 Claims, 3 Drawing Sheets

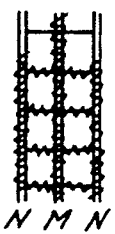 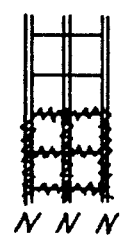 
FIG. 9A  FIG. 9B  FIG. 9C
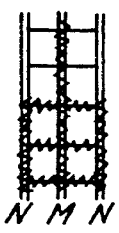 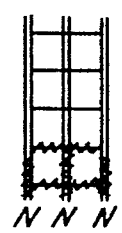 
FIG. 9D  FIG. 9E  FIG. 9F
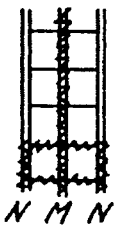 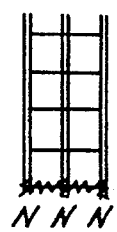 
FIG. 9G  FIG. 9H  FIG. 9I
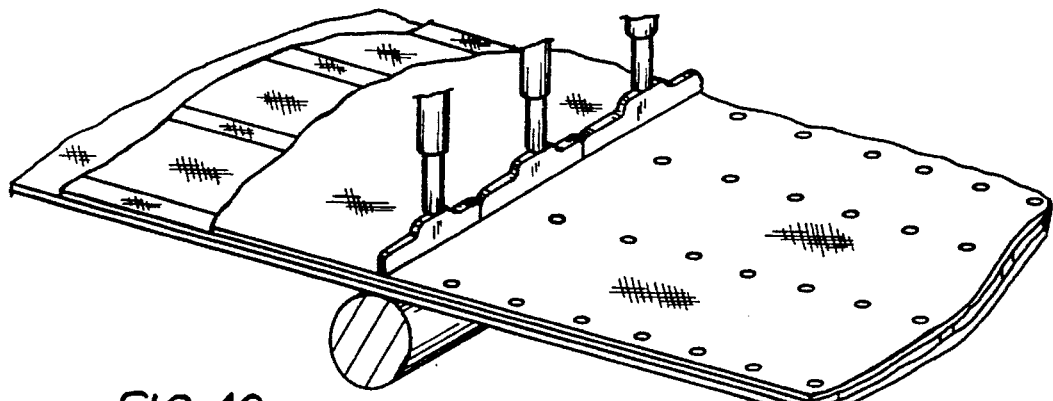
FIG. 10

THERMOPLASTIC FIBER LAMINATE

RELATED APPLICATION

This is a continuation-in-part application of Ser. No. 07/597,811, filed on Oct. 15, 1990, now abandoned.

BACKGROUND OF THE INVENTION

1. Field of the Invention

This invention relates to a laminated sheet of thermoplastic fibers for use in sorbing hydrocarbons and other liquids. In particular, this application relates to a nonwoven fibrous laminate formed by a layer of meltblown thermoplastic material ultrasonically bonded between two layers of needle punched material for providing a composite sheet which exhibits unique sorbent characteristics.

2. Description of the Related Art

Thermoplastics such as polypropylene, polyethylene, polystyrene, polyester, nylon, acrylic and many others can be extruded into very thin fibers, which are then collected and entangled to form a thin, porous nonwoven sheet of material. Such material is usable as an air filter, a filter for certain liquids, electrical and thermal insulation, and as a lining for garments. Some forms of the material sorb oil, tend to repel water, and tend to float on water, and are very useful for picking up oil spilled on a factory floor and for cleaning an oil slick off of a body of water.

One process of extruding and forming thin fibers of polypropylene and other thermoplastics, generally called "meltblowing" is well known and described, for instance, in an article entitled "Superfine Thermoplastic Fibers", *Industrial and Engineering Chemistry*, Vol. 48, No. 8, pp. 1342–1346, which describes work done at the Naval Research Laboratories; Naval Research Laboratory Report No. 11437, dated Apr. 15, 1954; U.S. Pat. No. 3,978,185 to Buntin et al.; and U.S. Pat. No. 4,100,324 to Anderson et al., each of which is herein incorporated by reference.

One known product produced by the applicant is a two-ply sheet of meltblown polypropylene fibers. This particular known product is made by laminating two layers of meltblown polypropylene fibers and ultrasonically welding the layers together at a number of points uniformly across the length and width so as to form a two-ply composite sheet. This two-ply sheet is further processed into rolls, pads, and wipes for uses such as cleaning an oil spill on a factory floor, wiping off oily machinery, skimming oil off of the surface of a body of water, and for a variety of other applications where the user desires to collect hydrocarbons or other liquids in a convenient, safe and clean manner. During such uses, this two-ply sheet has been found to have greater strength and durability than a single ply sheet of the same thickness.

Several others have made sheets of thermoplastic fiber material for sorbing liquids. For instance, U.S. Pat. No. 4,041,203 to Brock shows a nonwoven material 10 in the form of a laminate having as a top layer an integrated mat 12 of generally discontinuous thermoplastic fibers 14, and as a bottom layer, a web 16 of substantially continuous and randomly deposited filaments 18 of a thermoplastic polymer. The mat 12 and web 16 are attached at intermittent discrete bond regions 24 by passing the material through a pressure nip between heated rolls 42 and 44 having a plurality of raised points. The primary object of Brock is to provide a strong, yet textile-like nonwoven material. As another example, U.S. Pat. No. 4,469,734 to Minto shows a nonwoven web 34 of meltblown polymer fibers having a pattern of apertures 63 formed by passing the web 34 through a nip between heated rolls 67 and 68 engraved with a pattern of raised points. The rolls 67 and 68 rotate at different speeds to both bond the fibers together and to tear the web 34 to make apertures 63 within the bond areas. The apertures provide the web with the capability to absorb large quantities of fluid, especially if the fluid is too viscous to be taken up by the fiber web structure, and to enable the material to readily release the absorbed fluid. U.S. Pat. No. 4,885,202 to Lloyd shows a high strength composite tissue product 25 made by meltblowing a layer of thermoplastic fibers between two layers of paper tissue 7 and 8.

These known thermoplastic fiber sheets, however, do not provide a laminated pad which will draw liquid away from an outer layer and retain the liquid in an inner layer so as to provide the pad with a relatively liquid free outer surface. The prior art further lacks a three-layer pad of thermoplastic fibers in which an inner layer functions essentially as a barrier against liquid passing from one outer layer to the other. Also not known from the prior art is a laminated pad where one layer of material enhances the sorbing and holding capacity of another layer with respect to wicking, retention, contribution and insulation of a spill of hydrocarbons or other liquid.

SUMMARY OF THE INVENTION

A laminated sheet of thermoplastic fibers for sorbing hydrocarbons and other liquids is disclosed. More specifically, the laminated sheet of thermoplastic fibers comprises the novel combination of a layer of meltblown fibers bonded between two layers of needle punched fibers.

The laminated sheet has unique sorbing characteristics whereby the outer layers of needle punched fibers draw in and sorb the liquid toward a middle layer of meltblown fibers, which wicks the liquid away from the outer layers and distributes the liquid throughout the middle layer where it is retained, substantially isolated from the outer layers. The unexpectedly strong wicking and retention action of the present invention is attributable to the novel combination of needle punched and meltblown layers which cooperate to enhance the sorbing and holding of hydrocarbons and other liquids.

The result of the dual sorbing action provided by the needle punched and meltblown laminate is to reduce the relative presence of liquid in the outer layer. Such a result maximizes utilization of the outer layers by dispersing spilled liquids throughout the inner layer first, thereby increasing the useful life of the product by confining the spill to a local area. Such a result also increases the relative coefficient of friction of the surface of the outer layer, thereby providing a safer, less slippery surface for workers to walk on and perform their duties. Further, a particularly desirable sorbing behavior with respect to wicking, retention, contribution and insulation of such a spill is achieved.

In a preferred embodiment, the layers are bonded together at a number of discrete points across the length and width of the laminated sheet. The bonding may preferably be by ultrasonic welding. Further, in a preferred embodiment, the laminated sheet consists of the two outer needle punched layers extending across the full width of the composite sheet. The middle layer consists of a series of comparatively smaller sheets of meltblown material separated by very narrow strips of needle punched material. The combination of widths of the meltblown sheets and needle punched strips having a total width equal to the full width of the outer needle punched layers. The narrow separator strips provide a strong bonding area for the laminated sheet and hold the meltblown sheets in place.

BRIEF DESCRIPTION OF THE DRAWINGS

FIGS. 9A through 9I show the retention effect of the invention.

FIG. 10 is a perspective view of an ultrasonic welding station where the layers are bonded together, and further showing the laminated sheet constructed with two full width rolls or sheets of needle punched material, and the inner layer is made from a set of rolls or sheets of meltblown material separated by narrow rolls or strips of needle punched material.

DESCRIPTION OF THE PREFERRED EMBODIMENTS

Figure 1:
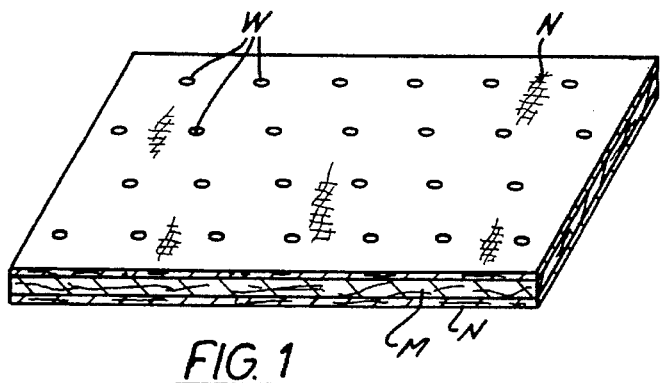
FIG. 1 shows a laminated sheet thermoplastic material having a layer of meltblown fibers bonded between two layers of needle punched fibers according to the invention.

Referring to FIG. 1 of the drawings, the laminated sheet of the invention has three layers of nonwoven thermoplastic fibers—a layer of meltblown fibers M sandwiched between two layers of needle punched fibers N. The layers in a preferred embodiment may be ultrasonically welded together at a number of points W across the length and width of the sheet.

The layer of meltblown fibers is made in accordance with the processes described in the references noted above. Generally, the meltblown process involves melting pellets of thermoplastic resin and extruding the material through a die tip. An air stream breaks up the extruded material into individual fibers. The fibers become entangled and are collected on a moving belt, where the entangled fibers solidify to form a thin nonwoven fibrous web. The meltblown process ordinarily produces fibers having diameters which range from about 0.1 to 100 microns. In a preferred embodiment the diameters of the majority of meltblown fibers may be from about 1 to 15 microns.

The meltblown process may use a wide variety of thermoplastic materials, especially those in the olefin family. The preferred meltblown material used in the present invention is 100% polypropylene. The meltblown process usually produces a continuous sheet or web of material which has a substantially uniform width of several feet and a length of several thousand feet. The material is wound lengthwise into large rolls, called mill rolls or parent rolls, and is commercially available from several manufacturers. For reasons discussed further below, the meltblown rolls are cut to a width which is comparatively less than the full width of a parent roll or mill roll. This less-than-full-width roll will, for the purpose of describing the present invention, be referred to as a trim roll.

A sheet or web of needle punched fibers is produced generally by melting and extruding a thermoplastic resin and spun bonding it into long, thin, continuous fibers. The extended fibers are drawn down by an airstream and collected on a moving belt to form a web. The web of fibers is then passed through one or more banks of multiple, reciprocating needles, which intertwine and entangle the fibers into a thin nonwoven sheet. The diameters of needle punched fibers are ordinarily larger than meltblown fibers. In a preferred embodiment, the diameters of the needle punched fibers may be from about 1 to 25 microns. The needle punch process may also use a wide variety of thermoplastic materials. The preferred material of the present invention is composite material made from about 30% nylon and 70% polyester. The production of needle punched material, sometimes called needle felt, is also produced in rolls which are typically referred to in the industry as mill rolls or parent rolls. For purposes of describing the present invention, two sizes of needle punched material will be referred to—a full width roll or full width sheet, and a separator roll or separator sheet. The separator rolls are quite narrow, about 2 inches wide, and as explained below, are placed in between the trim rolls of meltblown material.

The three layer laminated sheet of the invention may be made with an apparatus and method as described in U.S. patent application Ser. No. 520,678, filed on May 8, 1990, now U.S. Pat. No. 5,167,754, issued Dec. 1, 1992 and entitled "Layered Sheet of Thermoplastic Fiber Material and Method and Apparatus for Producing Same" the essentials of which are incorporated by reference herein. Generally, the apparatus has an unwind station for unwinding rolls of material into layers, a welding station for bonding the layers together, and a rewind station. The unwind station has three feed reel assemblies—two feed reels for unwinding two full width rolls for the outer layers of needle punched material and the third feed reel for unwinding the trim rolls and separator rolls which make up the inner layer of material. The third feed reel assembly is located substantially between the other two assemblies. From each of the three rolls material is withdrawn and brought into flatwise parallel relationship to each adjacent sheet such that the inner layer of material is sandwiched between the two outer layers of needle punched material.

Referring specifically to FIG. 10, the laminated sheet of the present invention is preferably constructed as follows. The two outer layers of needle punched material N are each made from full width rolls or full width sheets of material. The inner layer of material is made from a set of less-than-full-width rolls (i.e., trim rolls) of meltblown material. The trim rolls of meltblown material M are each separated by vary narrow separator rolls of needle punched material N'. The trim rolls of meltblown material M and the narrow separate rolls of needle punch material N' are withdrawn in parallel edge-to-edge relationship so as to form an inner layer of material sandwiched between the full width outer layers N of needle punched material. Further, the trim rolls and separator rolls are arranged so that a first outer edge of the inner layer is formed by the edge of a first narrow separator roll N' of needle punched material. The next adjacent roll is a first trim roll of meltblown material M. The next adjacent roll after that is a second narrow separator roll of needle punched material N'. The next adjacent roll after that is a second trim roll of meltblown material M, and so on. The alternating pattern of trim rolls and separator rolls is continued until the combined width of the material reaches to the other edge of the full width of the laminated sheet. The opposite edge of the inner layer is also made from a narrow separator strip of needle punched material N'.

The three layers of material are then advanced through the machine at a uniform rate to a welding station where the layers are ultrasonically welded together at points uniformly spaced across the length and width of the composite sheet. In the areas of the narrow separator strips N', the welding station is essentially bonding three layers of needle punched material together. Since all three layers are made of exactly the same material, the three layers all respond to the ultrasonic bonding process in exactly the same way, and the bond W is especially strong. The strong bonds between all three layers in the areas of the separator strips provides for an especially strong and durable composite sheet. In the areas of the meltblown material, the three layers of material are different and therefore behave differently when subjected to ultrasonic welding, and it is difficult to produce a strong bond. However, since the bonds in the area of the separator sheets are quite strong, tack welds in the meltblown areas are sufficient. The resulting laminated sheet therefore has strong bonds in the areas of the separator sheets which hold all three layers securely together. Also, the separator sheets in combination with the tack welds in the meltblown areas satisfactorily hold the meltblown sheet in place.

The resulting laminated sheet may be further processed by slitting it down the middle of the separator sheet. Using about a two-inch wide separator roll provides enough material to adequately bond the layers together, and the full width composite sheet can then be slit into smaller sizes for making pads and rolls of the final product.

The invention of a needle punched-meltblown-needle punched laminate (NMN laminate) performs in a way not anticipated by its individual components. A study of the invention demonstrated the unique, unexpected performance related and safety related effects of the NMN laminate in response to typical spill sources designated as S in FIGS. 2 through 9.

Figure 2A:
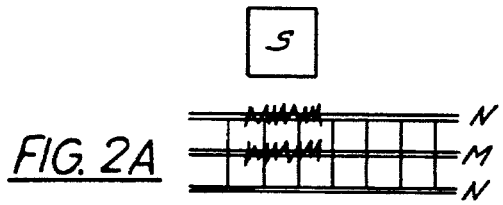
FIG. 2A shows the bottom surface protection effect of the invention.

FIG. 2A shows the bottom protection effect of the invention. A spill source S from above the pad of an intermittent drip of medium grade oil (e.g. SAE 30 nondetergent oil), dripping at a rate of about 60 drops per minute, was sorbed by the top layer of needle punched fibers and wicked and retained by the layer of meltblown fibers. The meltblown layer acted as a barrier to ensure that the bottom layer of needle punched fibers was relatively lubricant free, at least until the meltblown layer reached the saturation level. The NMN laminate provided better bottom protection by preventing breakthrough of oil to the bottom layer for four to six times longer, measured by either time or volume of oil, as compared to an all needle punched pad and as compared to a competitive sorbent rug made of nonwoven fibers treated for the absorption of oil. The bottom protection effect of the NMN laminate makes the laminate useful, for instance, for sorbing oil under a machine which is dripping oil. The NMN laminate will wick and retain the oil in the meltblown middle layer and protect the floor beneath the pad from becoming wet with liquid.

Figure 2B:
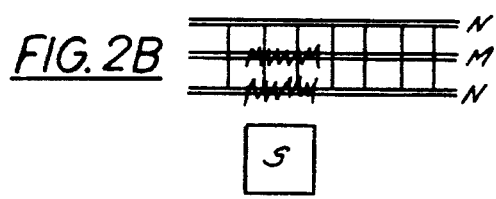
FIG. 2B shows the top surface protection effect.

FIG. 2B shows the top protection effect, whereby the NMN laminate was laid over a spill source S, which simulated a spill of oil on a factory floor. Again, the meltblown layer functioned as a barrier ensuring that the top layer of needle punched fibers was relatively lubricant free until the meltblown layer reached saturation. The NMN laminate gave better top protection by preventing breakthrough to the top layer for three to ten times longer, in time or volume, than either the all needle punched pad or the treated sorbent rug.

Figure 3A:
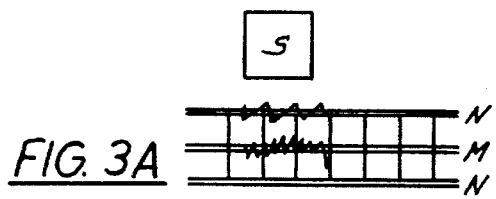
FIG. 3A shows the top draw-away effect of the invention.
Figure 3B:
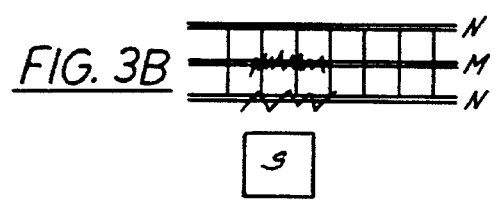
FIG. 3B shows the bottom draw-away effect.

FIG. 3A shows the top draw-away effect of the NMN laminate, whereby a spill S above the pad of ten milliliters of medium weight oil was sorbed initially by the top layer of needle punched fibers. The meltblown layer drew the liquid out of the top layer over time, reducing the relative presence of lubricant on the top surface of the pad. No oil was observed in the bottom layer of needle punched fibers, and less then 7% of the oil remained in the top layer after 24 hours, which was not enough to be visible to the unaided eye nor did it impart a slippery feel. FIG. 3B shows the bottom draw-away effect, whereby a spill S below the pad of ten milliliters of medium grade oil was sorbed initially by the bottom layer of needle punched fibers. The meltblown layer drew the liquid out of the bottom layer with intermittent pressure, thus reducing the relative presence of liquid in the bottom layer of the pad to less than 8% of the oil. The top draw-away and bottom draw-away effects appeared to function with approximately equal efficiency whether or not the pad was subjected to intermittent pressure as would occur if the pad was stepped on.

Figure 4A:
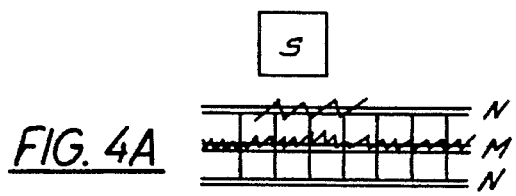
FIG. 4A shows the top distribution effect of the invention.
Figure 4B:
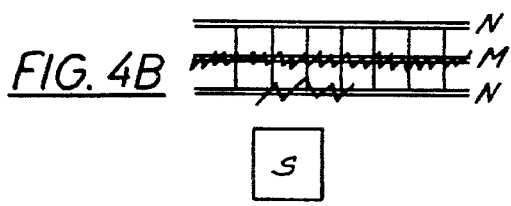
FIG. 4B shows the bottom distribution effect of the invention.

FIG. 4A shows the top distribution effect of the NMN laminate. With a continuous top spill source S, the meltblown material drew the spill out of the needle punched layer and distributed the liquid over an area two to three times larger than the distribution provided by just the needle punched layer. This effect ensured full internal utilization of the pad prior to external surface utilization, thus reducing the relative amount of liquid in the top surface of the pad. FIG. 4B shows a similar bottom distribution effect. That is, with a continuous bottom spill source S the meltblown material drew the liquid out of the lower needle punched layer and distributed the liquid over an area from six to eighty percent larger than the distribution by the needle punched layer. This effect delays utilization of the outside layers over time and confines a spill to a small local portion of the outside layers, reducing a tendency on the part of a spilled liquid to first spread throughout the outer layers. This effect keeps the spill localized and prevents it from spreading relative to the outside layers.

Figure 5A:
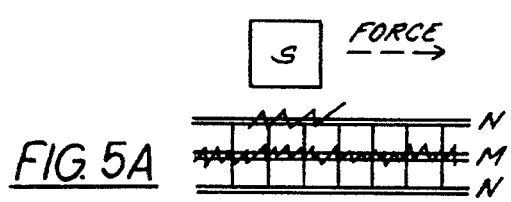
FIGS. 5A and 5B show the slip effect of the invention.
Figure 5B:
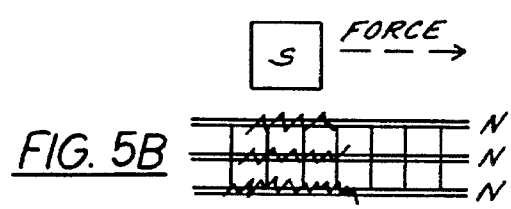

FIG. 5A shows the slip effect of the NMN laminate as compared to a pad in which all three layers are needle punched fibers as in FIG. 5B. The slip force was measured by weighing the two pads and measuring the force necessary to pull the pads along a surface after each pad has been partially saturated with oil, and after full saturation. The slip force of the all needle punched pad dropped rapidly at partial saturation, and dropped even further at full saturation. The NMN laminate did not exhibit any decrease in slip force at partial saturation, and even at full saturation required a 10% greater force to cause slippage as compared to the all needle punched pad. In the NMN laminate, the meltblown layer drew some of the liquid away from the outer needle punched layer, thus reducing the relative amount of liquid in the needle punched layer. Less liquid meant that the outer surface was less slippery, i.e., had a higher coefficient of friction, as compared to the all needle punched pad. In circumstances where workers have to walk on the pad at a spill site, the NMN laminate is less slippery and therefore provides a safer pad for persons to walk on than does the all needle punched pad.

Figure 6A:
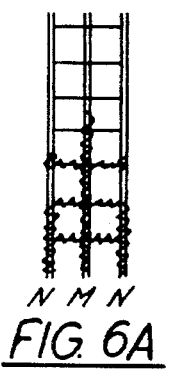
FIGS. 6A and 6B show the wick-up effect of the invention.
Figure 6B:
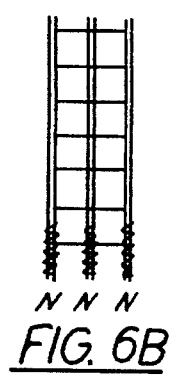
Figure 6C:
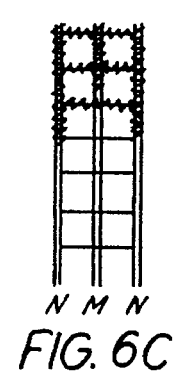
FIGS. 6C and 6D show the wick-down effect.
Figure 6D:
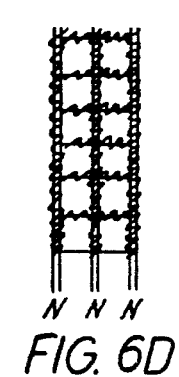

FIG. 6A shows the wick-up effect of a NMN laminate as compared to a pad having all three layers of needle punched fibers as in FIG. 6B. The introduction of a middle layer of meltblown fibers produced a higher wicking effect in the two outside layers of needle punched fibers than did the pad having a middle layer of needle punched fibers. FIGS. 6C and 6D show the wick-down effect. In this case, the introduction of a middle layer of meltblown fibers produced a higher retention of liquid and retarded the downward migration of the oil in the two outside layers of needle punched fibers as compared with the pad having all three layers of needle punched fibers.

Figure 7A:
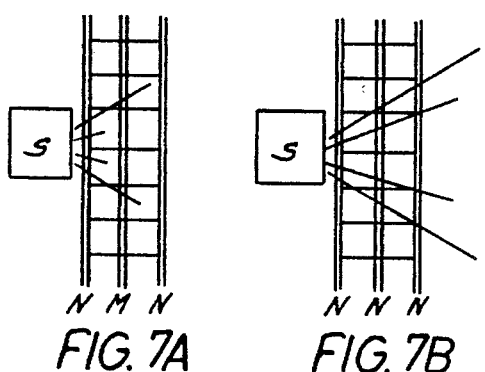
FIGS. 7A and 7B show the insulation effect of the invention.
Figure 7B:
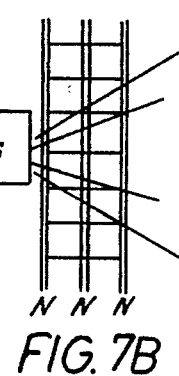

FIG. 7A shows the insulation effect of the NMN laminate, as compared to an all needle punched pad as shown in FIG. 7B, in response to a spill source S which sprayed an oil aerosol toward the laminate. The middle layer of meltblown fibers of the NMN laminate showed a 300% increase in the time and volume of oil needed to break through the material when it was exposed to an oil aerosol as compared to the pad having all three layers of needle punched fibers. The NMN laminate therefore provides added protection against liquid or air passage where it is used as a divider, wall covering or insulator.

Figure 8A:
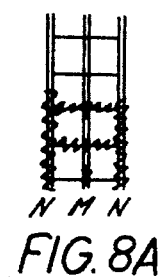
FIGS. 8A through 8I show the contribution effect of the invention.
Figure 8B:
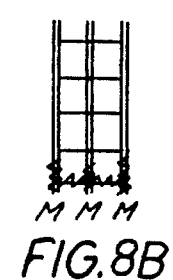
Figure 8C:
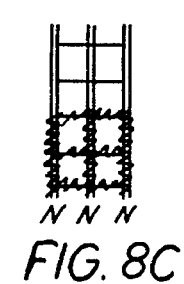

FIGS. 8A through 8I show the contribution effect of the NMN laminate in sorbing heavy weight, medium weight, and light weight oils as compared to a pad having all meltblown fibers and as compared to a pad having all needle punched fibers. Referring to FIGS. 8A, 8B and 8C, with heavy weight oil (e.g. No. 6 fuel oil), the all needle punched pad sorbed and wicked a greater volume of oil than did the all meltblown pad. In the NMN laminate, the needle punched layers caused the meltblown layer to wick better than when meltblown was at work by itself, with the ultrasonic welds providing transfer assistance of the liquid from one layer to another.

Figure 8D:
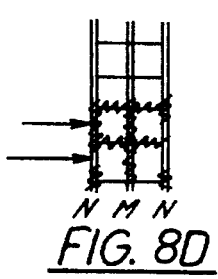
Figure 8E:
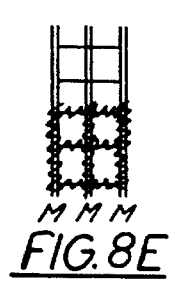
Figure 8F:
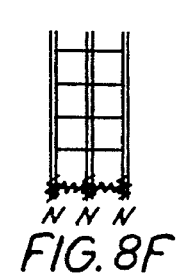

Referring to FIGS. 8D, 8E and 8F, with medium weight oil (e.g., SAE 30 nondetergent oil), the all meltblown pad sorbed and wicked more oil than did the all needle punched pad. In the NMN laminate, the meltblown layer caused the needle punched layers to wick better than when the needle punched was at work by itself, with the welds again providing transfer assistance of the liquid.

Figure 8G:
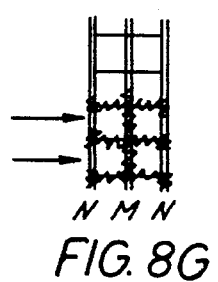
Figure 8H:
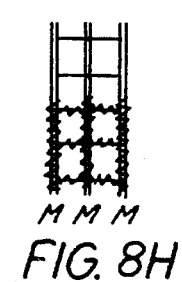
Figure 8I:
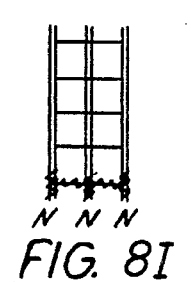

Referring to FIGS. 8G, 8H and 8I, with light weight oil (e.g., No. 2 fuel oil), the all meltblown pad sorbed and wicked more oil than the all needle punched pad. In the NMN laminate, the meltblown layer caused the needle punched layers to wick better than when the needle punched was at work by itself. The NMN laminate therefore provides a better preforming, more versatile, oil sorbing pad than either meltblown or needle punched pads alone.

FIGS. 9A through 9I show the retention effect of the NMN laminate in retaining heavy weight, medium, and light weight oils as compared to a pad having three layers of needle punched fibers and as compared to a single layer of needle punched fibers. After full saturation of the pads and vertical 10-minute drain, the NMN laminate retained more liquid than either the three layer needle punched pad or the single ply needle punched pad. Additionally, the all needle punched pads showed a greater concentration of liquid at the bottom of the pad than did the NMN laminate. FIGS. 9A, 9B and 9C show the retention effect with respect to heavy weight oil; FIGS. 9D, 9E and 9F show the retention effect on medium weight oil; FIGS. 9G, 9H and 9I show the retention effect on light weight oil. The heavier the weight of the oil, the greater was the retention effect of the NMN laminate.

The above describes the unique characteristics of the invention in regard to sorbing liquids, especially hydrocarbons. The NMN laminate may, however, have additional, unexpected performance characteristics when used in other applications, such as for an insulator, filter or garment material.

We therefore claim as our invention:

1. A laminated sheet of thermoplastic material comprising a separate inner layer of meltblown fibers sandwiched between two separate outer layers of needle punched fibers and bonded together at a number of discrete points across the length and width of the laminated sheet, wherein the two outer layers are each comprised of a full width sheet of needle punched material, and the inner layer is comprised of a set of meltblown sheets of material, the meltblown sheets being separated by narrow strips of needle punched fibrous material.

2. The laminated sheet according to claim 1, wherein said bond comprises ultrasonic welds.

3. The laminated sheet according to claim 2, wherein the layer of meltblown fibers comprises 100% polypropylene fibers, the majority of said meltblown fibers having diameters which range from about 1 to 15 microns.

4. The laminated sheet according to claim 3 wherein the two layers of needle punched fibers each comprise fibers made of a composite material of about 30% nylon and 70% polyester, the majority of said needle punched fibers having diameters which range from about 1 to 25 microns.

5. A layered sheet of nonwoven fibers comprising:

first and second outer layers of needle punched fibers;

an inner layer of nonwoven fibers, said inner layer being comprised of a set of sheets of meltblown material, the sheets of meltblown material being separated by narrow strips of needle punched fibrous material, and said sheets and strips being in parallel edge-to-edge relationship such that said sheets and strips have a combined width substantially equal to a full width of said first and second outer layers of needle punched fibers;

said layers being in flatwise parallel relationship so that said inner layer is sandwiched between said first and second layers of needle punched fibers; and said layers being ultrasonically welded together at a number of discrete points across the length and width of said sheet.

6. The layered sheet according to claim 5, wherein each narrow strip of needle punched fibrous material is bonded at a number of points to the first and second outer layers of material.

7. A laminated sheet of oil sorbent material comprising:

a first, full width, outer layer of nonwoven, thermoplastic needle punched fibers;

a second, full width, outer layer of nonwoven, thermoplastic needle punched fibers;

an inner layer of nonwoven thermoplastic fibers sandwiched between the first and second outer layers, said inner layer comprising a set of sheets of meltblown material, the sheets being separated from each other by narrow strips of needle punched fibrous material, the sheets and strips being laid side-by-side in parallel edge-to-edge relationship and having a combined width substantially equal to the full width layers of needle punched fibers, and the narrow strips of needle punched material are bonded at a number of discrete points to the first and second outer layer of needle punched fibers.

8. The laminated sheet according to claim 7, wherein the meltblown fibers are comprised of polypropylene, and the needle punched fibers are comprised of a composite material of nylon and polyester.

9. The laminated sheet according to claim 8, wherein the composite material comprises about 30% nylon and 70% polyester.

* * * * *